United States Patent Office 3,073,699
Patented Jan. 15, 1963

3,073,699
ADDITION POLYMERIZABLE DYE-FORMING COMPOSITIONS, ELEMENTS, AND PROCESSES
John Charles Firestine, South River, N.J., assignor to E. I. du Pont de Nemours and Company, Wilmington, Del., a corporation of Delaware
No Drawing. Filed Mar. 17, 1959, Ser. No. 799,840
11 Claims. (Cl. 96—35)

This invention relates to new dye-forming compounds and to compositions and image-forming elements embodying said compounds. More particularly, it relates to addition-polymerizable, dye-forming compounds capable of forming photographic sensitizing dyes, e.g., methine, polymethine cyanine dyes, merocyanine and styryl dyes and to compositions and image-forming elements embodying such compounds. The invention also relates to a process of producing colored images by the image-wise exposure of a layer containing one or more of the aforementioned compounds.

An object of this invention is to provide new addition-polymerizable, dye-forming compounds. Another object is to provide such compounds which form photographic sensitizing dyes of the above types. Yet another object is to provide such compounds which form high quality dye images. A further object is to provide photographic or image-forming elements, e.g., films, plates and papers containing such compounds in an image-yielding layer. A still further object is to provide new processes for forming colored images which do not require expensive light-sensitive silver salts. Still further objects will become apparent from the following description of the invention.

The novel addition-polymerizable, dye-forming monomeric compounds of this invention comprise 5- or 6-membered heterocyclic nitrogen compounds having at least one benzene ring which have in the alpha or gamma position to the heterocyclic nitrogen atom a reactive group, e.g., alkyl, a hydrocarbonmercapto group including alkylmercapto, arylmercapto and aralkylmercapto, and alkylmercaptovinyl groups and having attached to a carbon atom of the heterocyclic ring or to a benzene ring fused to the heterocyclic ring, directly or through a benzene ring, at least one radical containing an addition polymerizable ethylenically unsaturated group. In the preferred compounds of the invention, an acrylamido- or an alpha-hydrocarbon-substituted acrylamido group, e.g., methacrylamido group, or an alpha-halogen substituted acrylamido group, is linked to the benzene ring of the heterocyclic nitrogen compound. An important class of such compounds is represented by the general formula:

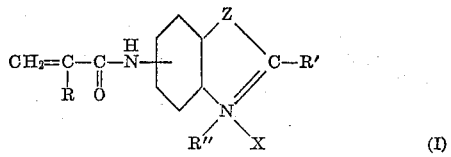

wherein R is a member selected from the group consisting of hydrogen, alkyl of 1–4 carbon atoms, e.g., methyl, ethyl, isopropyl and n-butyl; aryl, e.g., phenyl; aralkyl, e.g., benzyl; or halogen, e.g., chlorine; R' is hydrogen or a reactive group capable of dye condensation selected from the group consisting of reactive alkyl, e.g., methyl, ethyl and propyl, and hydrocarbonmercapto, e.g., alkylmercapto of 1–4 carbon atoms including methyl- and ethylmercapto; aralkylmercapto, including benzylmercapto; arylmercapto, e.g., phenylmercapto. In these radicals the alkyl group contains 1–4 carbon atoms, e.g., methyl, ethyl and n-propyl. In the foregoing formula R" is alkyl and X is a negative acid radical, and Z is a divalent radical selected from the group consisting of

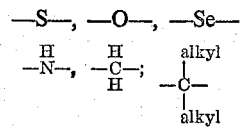

and

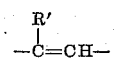

wherein R' is the same as defined above with respect to the heterocyclic formula. This divalent radical completes with the remaining atoms an azole nucleus or radical such as a thiazole, oxazole, selenazole, iminazole, indolenine, dialkylindolenine or a pyridine radical which, with a benzene ring fused thereto, provides, for example, a benzthiazole, benzoxazole, benzselenazole, benziminazole, indolenine, dialkylindolenine, or quinoline radical. X can be halogen, e.g., Cl, Br or I, p-toluene sulfonate, or alkyl sulfate, e.g., methyl or ethyl sulfate.

Acrylamido and alpha-hydrocarbon-substituted acrylamido compounds of the invention can be made by reacting the corresponding acid halide, e.g., chloride or other amide-forming derivative with an amino-substituted heterocyclic nitrogen compound, e.g., 2-methyl-6-aminobenzthiazole, 2-methyl-5-aminobenzthiazole, 2,4-dimethyl-6-aminobenzthiazole, 6-aminoquinaldine, 2-methyl-mercapto-6-amino-quinoline, 2-methylmercapto-5-aminobenzothiazole and their quaternary salts, e.g., alkyl halide, alkyl p-toluene sulfonate or dialkyl sulfate. Suitable specific such compounds including specific quaternary salts are described in Koslowski U.S. Patent 2,107,379.

The addition polymerizable compounds having the above Formula I or their addition polymers can be reacted by any conventional methine dye condensation to form a host of novel methine (including polymethine dyes, merocyanine and styryl dyes. The dye-forming reaction can take place prior to, simultaneously with, or subsequent to the addition polymerization reaction.

For example, monomeric and polymeric carbocyanine dyes can be prepared by condensation of the dye forming monomers of Formula I or their polymers with a heterocyclic quaternary ammonium salt, e.g., the methiodide and an ortho ester, e.g., ethylorthoformate, ethylorthoacetate, etc. in the presence of an acid binding agent, e.g., pyridine. Alternatively, symmetrical and unsymmetrical dyes can be made by condensing the polymer with a diarylformamidine or a C-alkyl diarylformamidine in the presence of acetic anhydride and reacting the product with the same or a different heterocyclic quaternary ammonium salt having a reactive methyl group. The reverse reaction in which the diarylformamidine is reacted with the monoquaternary salt and the dye-forming polymer can, of course, be used.

Styryl dyes can be prepared by reacting dye-forming monomers of Formula I or their addition polymers containing reactive methyl quaternary ammonium heterocyclic nuclei with a dialkylaminobenzaldehyde in the presence of a basic condensing agent, e.g., piperidine. An analogous reaction with p-dialkylamino cinnamic aldehydes is also possible.

Dicarbocyanines can be prepared by reacting the monomer of Formula I or their addition polymers containing the quaternary ammonium heterocyclic nuclei with active methyl groups with another quaternary salt of the type used in preparing cyanine dyes in the presence of anilidoacrolein anil and an organic base, e.g., pyridine, trimethylamine, etc. Tricarbocyanines can be prepared in a similar manner by substituting glutaconic aldehyde dianilide for the anilidoacrolein anil.

Merocyanine dyes can be prepared by reacting the monomers of Formula I or their addition polymers containing cycloammonium salt nuclei with active ketomethylene compounds of the various specific types described in Brooker U.S. Patent 2,078,233.

Novel photopolymerizable compositions of the invention comprise as essential ingredients (*a*) the addition-polymerizable dye-forming monomers described above and (*b*) an addition polymerization initiator activatable by actinic light which is thermally inactive below 80° C. and, if desired, can contain (*c*) a binding agent for the ingredients. Other adjuvants useful in addition polymerizable compositions can be used. The binding agent can be any natural or synthetic organic water-permeable colloid having protective colloid properties. It can be a solvent-soluble synthetic resin or superpolymer. Suitable binders include gelatin, casein, agar-agar; polyvinyl alcohol and its partial ethers, esters and acetals; hydroxyethyl cellulose, water-soluble methyl cellulose, cellulose gycollic acid, cellulose acetate/succinate; polyvinylpyrrolidones; polyacrylamides, polymethyacrylamides; vinylidene chloride/acrylonitrile copolymers, etc.

In general, the above constituents (*a*), (*b*) and (*c*) are present in the compositions in amounts from 0.5 to 99.9%, 0.1 to 30% and 0 to 99.4% by weight of the total composition. The compositions, however, may contain other addition polymerizable monomers which do not contain dye coupling groups. Thus, addition polymerizable monomers capable of forming high polymers by photoinitiated polymerization can be present in amounts up to 10 moles per mol of the dye-forming monomer. Suitable monomers of this type are described in Plambeck 2,760,863. They usually are vinyl or vinylidene compounds which have a normal boiling point above 80° C., a molecular weight from 100 to about 1500 and at least one terminal ethylenic group for every 100–250 units of molecular weight.

In addition, the layers of the photopolymerizable elements can contain fillers, or opacifying agents, which impart "tooth" or roughness to the surface; antihalation dyes or pigments. Antiabrasion layers can be coated on the photopolymerizable layers.

The photographic process of the invention comprises (1) exposing to actinic light image-wise, e.g., through a continuous tone, halftone or line negative, a photopolymerizable layer of the above-described compositions until substantial addition polymerization takes place without polymerization in the unexposed portions of the layer, (2) removing unpolymerized monomer from the unexposed portions of the layer, and (3) treating the exposed layer with a developer solution to form a polymeric dye image, steps (2) and (3) being carried out in either order.

The exposed photopolymerizable layer is simultaneously developed and fixed by treating it with a solution of the developer in a solvent that is a solvent for the monomer. This may be done by soaking the print in the developer whereupon occur the coupling of dye former and developer (development) and the elution of the unexposed monomer (fixing). Alternatively, the print can be fixed first by placing it in the solvent first to remove the unexposed monomer and then placing it in developer where coupling occurs.

Suitable light sources that emit actinic light within the range 1800 to 7000 A. are described in U.S. Patent 2,760,863 and include carbon arcs, mercury vapor lamps, etc.

The invention will be further illustrated by but is not to be limited to the following examples:

EXAMPLE 1

6-Methacrylamidoquinaldine

To a 2-liter round-bottomed flask fitted with a condenser were added 138 g. (1 mole) p-nitroaniline, 138 g. hydrochloric acid, and 110 g. paraldehyde (2 mole), i.e., a 25% excess. A vigorous reaction took place which was kept under control by cooling in an ice bath. The mixture was then heated on a stream bath for 1 hour. It was diluted with 10 liters of water, cooled, and filtered by suction to remove tars. The filtrate was treated with sodium acetate, and the desired 6-nitroquinaldine separated. The product was filtered by suction, washed with water, and dried in air to yield 40 g. of a yellow solid, M.P. 161–163° C. (21% of the theoretical).

To a 2-liter round-bottomed flask fitted with a reflux condenser was added 40 g. (0.4 mole) 6-nitroquinaldine, 180 g. stannous chloride, and 200 ml. C.P. hydrochloric acid. The mixture was heated under reflux for 2 hours and then made strongly alkaline. It was then heated to reflux, cooled, and diluted with water. The desired product, 6-aminoquinaldine, separated as a solid. The solid was filtered by suction, washed with water, and dried in air. It was then recrystallized from ether to yield 30.5 g. of a white solid, M.P. 188–189° C. (44% of the theoretical).

To a 200-ml. beaker there was added 15.86 g. (0.1 mole) 6-aminoquinaldine. Then there was added drop-wise 11 g. (0.1 mole) methacrylyl chloride, the temperature being kept just under 45° C. After the reaction temperature started to drop, the reaction mixture was made just alkaline with sodium carbonate solution. A white solid gradually separated out of solution. The solid was filtered by suction and again suspended in sodium carbonate solution. The solution was warmed to 55° C. and then cooled. The product was filtered by suction and washed with water. It was then dissolved in ether, dried with potassium carbonate, filtered, and evaporated to obtain 11 g. of an almost white solid, M.P. 154–156° C. (50% of the theoretical).

This compound, 6-methacrylamidoquinaldine, was quaternized by reacting it with an equimolar amount of dimethyl sulfate at 60° C. This solution was then diluted with acetone and precipitated with ether. The 6-methacrylamido-1-methylquinaldinium methosulfate was collected on a filter and washed with ether.

EXAMPLE 2

To a 250-ml. heat-resistant glass reaction vessel there were aded 50 ml. of a solution of 100 g. of polyvinyl alcohol (88% hydrolyzed, viscosity of 4% aqueous solution 4–6 centipoises at 20° C.) in 500 ml. water and 500 ml. of 95% ethanol, 2 g. 6-methacrylamido-1-methylquinaldinium methosulfate, 2 g. 5,6-dimethoxy-1-methyl-2-methylmercaptobenzothiazolium methosulfate and 1 g. benzoin methyl ether in 15 ml. of 95% ethanol. The mixture was stirred until completely dissolved. It was then coated on 6 x 8 inch white poster board under subdued light and allowed to dry at room temperature. The sensitized support was exposed through a negative for 2 minutes to a 275-watt sunlamp and was developed with a 50% ethyl alcohol solution of amonium hydroxide (28% $NH_3$). A deep red positive image formed, indicating that dye coupling took place. The unexposed areas were washed free of unpolymerized monomer with 95% ethanol.

A wide variety of image colors may be obtained by varying the reactants. For example, to the reaction vessel containing 50 ml. of a polyvinyl alcohol solution as described above there were aded 1.76 g. (.005 mole) 6-methacrylamido - 1 - methylquinaldinium methosulfate, 1.53 g. (.005 mole) of the methomethsulfate quaternary salt of 2-methylmercaptobenzothiazole, and 1 g. benzoin methyl ether in 15 ml. of 95% ethanol. The mixture was stirred and coated on poster board and the resulting coating was exposed, developed and washed as described in the paragraph above to yield a deep orange-red positive image.

EXAMPLE 3

To a 100-ml. heat-resistant glass reaction vessel there were added 25 ml. of the polyvinyl alcohol solution described in Example 2, 1 g. 6-methacrylamido-1-methylquinaldinium methosulfate, and 0.5 g. of benzoin methyl ether dissolved in 10 ml. of 95% ethanol. The mixture was stirred until completely dissolved and was coated on 6 x 8 inch white poster board under subdued light.

One half of the support was exposed for 2 minutes as in Example 2 through a continuous-tone negative and then developed with a 50% ethyl alcohol/ammonium hydroxide solution to give a deep blue image. The print was washed well with 95% ethanol.

The second half of the exposed support was treated with a basic solution containing 1 g. of 5,6-dimethoxy-1-methyl - 2 - methylmercaptobenzothiazolium methosulfate to give a deep red image. The unexposed areas were washed free of unpolymerized monomer with 95% ethanol, leaving a red positive. The print was of good quality with high resolution, low stain in unexposed areas, and medium contrast.

EXAMPLE 4

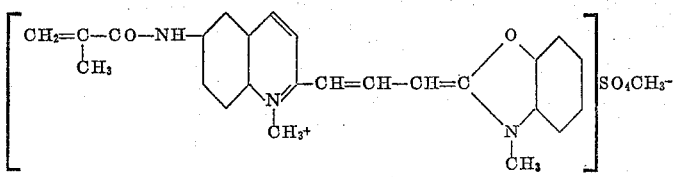

To a 50-ml. Erlenmeyer flask there were added 100 ml. of a polyvinyl alcohol solution like that described in Example 2, 1 g. of 6-methacrylamido-1-methylquinaldinium methosulfate and 1 g. benzoin methyl ether dissolved in 15 ml. ethanol. The resulting solution was then coated under subdued light on a 4 x 6 inch piece of white poster board, air dried and then exposed through a 65-line halftone negative for 1 minute. This coating was then treated by pouring over it a solution consisting of 1 g. of the methomethsulfate quaternary salt of 2-beta-methylmercaptovinylbenzoxazole and 25 ml. ethanol. A solution of 1 g. triethylamine in 15 ml. of 95% ethanol was then poured over the support and a deep purple dye image formed. The unpolymerized areas were washed free by the ethanol leaving the desired image in the exposed areas. The dye image consisted of a polymer of (3-methyl-2-benzoxazole)(1-methyl-6-methacrylamido-2-quinoline)trimethinecyanine methosulfate, the structural formula of the monomeric dye being shown above.

EXAMPLE 5

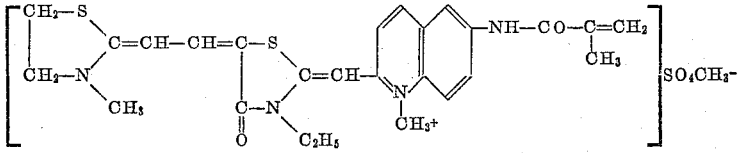

In a 250-ml. Erlenmeyer flask a solution was prepared which consisted of the following materials: 1 g. 6-methacrylamido-1-methylquinaldinium methosulfate, 25 ml. of a polyvinyl alcohol solution like that described in Example 2 and 1 g. benzoin methyl ether dissolved in 15 ml. ethanol. This solution was then coated on a 4 x 6 inch piece of poster board under subdued light and air dried. It was then exposed through a 65-line half-tone negative for 1 min. The exposed coating was then treated with developer solution (described below by pouring it over the coating.

DEVELOPER SOLUTION

To a 125-ml. Erlenmeyer flask were added 1 g. of the merocyanine dye, 5-(3-methyl-2-thiazolidene-ethylidene)-3-ethylrhodanine (prepared similarly to procedures disclosed in Brooker, U.S. Patent 2,078,233), and 3 g. dimethyl sulfate. The mixture was heated on the steam bath for 10 minutes and then treated with 40 ml. of acetone. The resulting merocyanine quaternary salt separated out of solution as a brick red dye. The dye was filtered on a suction filter, washed with ether and air dried. The developer solution was then prepared, which consisted of the following materials: 1 g. merocyanine quaternary salt described above, 25 mls. ethanol and 1 ml. triethylamine. During the treatment of the exposed element with the devolper solution the desired cyan-colored positive dye image formed. The dye was a polymer of the monomeric dye (3-ethyl-5-[(3-methylthiazolinylidene)ethylidene]-2-thiazolin-4-one)(1-methyl - 6-methacrylamido-2 - quinoline)methinecyanine methosulfate, the structural formula of which is given above. The element was then treated with 95% ethanol to wash out the unpolymerized monomer.

EXAMPLE 6

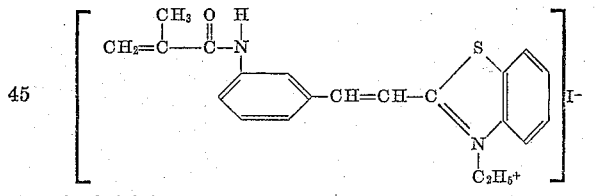

3-ethyl-2-(m-methacrylamido)styrylbenzothiazolium iodide

Solution A:
    1.89 g. (.01 mole) m-methacrylamidobenzaldehyde
    50 ml. of a polyvinyl alcohol solution as described in Example 2

Solution B:
    1 g. benzoin methyl ether, and
    15 ml. ethanol

Solution A was dissolved in solution B and coated on a piece of white poster board under subdued light. The coating was dried and exposed through a 65 line half-tone negative for 2 minutes to 275-watt sunlamp. The unexposed areas were then washed free of unpolymerized monomer with ethanol. It was then treated with a solution of 3.49 g. of 3-ethyl-2-methylbenzothiazolium iodide and 2 ml. of triethylamine dissolved in 50 ml. ethanol and a faint purple positive image was obtained after standing for 1 hr. Obviously a deeper image color could have been formed in a shorter time by the application of heat during development.

EXAMPLE 7

*2,3-Dimethyl-5-Methacrylamidobenzothiazolium Methosulfate*

To a 5 liter, 3-necked flask fitted with a stirrer and dropping funnel there were added 405 g. (2 moles) 2,4-dinitrochlorobenzene and 2000 ml. ethanol. The mixture was heated to reflux with stirring and a polysulfide solution was added. This polysulfide solution was prepared by dissolving 240 g. (1 mole) Na₂S·9H₂O in 300 ml. of water. To this was added 32 g. of sulfur and 100 ml. of ethanol. After stirring on a steam bath, the resulting polysulfide solution was added dropwise through the dropping funnel to the above described reaction mixture and a yellow solid separated during the refluxing. Refluxing was continued for one-half hour after the dropwise addition of polysulfide was completed. After cooling, the yellow solid was filtered, washed with water and then acetone, and air dried. The yield was 175 g. of 2,2',4,4'-tetranitrodiphenyldisulfide, M.P. 270° C.

A mixture of 158 g. of the disulfide just prepared and 1500 ml. of acetic anhydride was heated to boiling and treated by addition of zinc dust in small portions until no further reduction took place. Zinc acetate and excess zinc were removed from the solution by filtration on a suction funnel. The acetic anhydride was distilled off in vacuum and to the oily residue, 400 ml. of hydrochloric acid were slowly added. Hydrolysis of the acetyl group to the free amine was then effected by refluxing for 15 minutes. The solution was made alkaline with 20% NaOH, and extracted with ether. The ether solution was dried and filtered, and evaporated to a volume of 500 ml. HCl gas was then bubbled into the solution and a white solid separated out. This solid was filtered, washed with ether and air dried. The yield was 47 g. of 2-methyl-5-aminobenzothiazole di-hydrochloride, a white solid having a pink tint.

A portion of this product, 47 g. (0.2 mole), was added along with 400 ml. of dry pyridine to a 1 l., round-bottom, 3-neck flask fitted with a stirrer and thermometer. The mixture was stirred and cooled to 20° C. Then 31.5 g. (0.3 mole) methacrylylchloride was added dropwise. After the addition was complete, the mixture was warmed to 50° C., the pyridine removed in vacuum, and the residue mixed with water. The product was an oil which later solidified. After filtration, washing with water, air drying, and recrystallization from ether and charcoal there was obtained a yield of 38 g. of the monomeric color former, 2-methyl-5-methacrylamidobenzothiazole, a pink-white solid with a melting point of 113° C.

A mixture of 23.2 g. (0.1 mole) of this monomer and 12.6 g. (0.1 mole) of dimethylsulfate was warmed on a steam bath. After a vigorous reaction, the resultant tacky mass was stirred in acetone and the desired quaternary salt separated. The product, named at the start of this example, was filtered and washed with acetone and dried to yield 20 g. of purified product which was a pink solid.

EXAMPLE 8

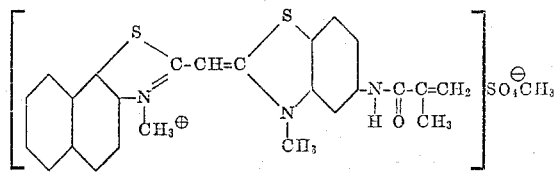

[5-methacrylamido-3-methylbenzothiazole-(2)][3-methyl-alpha-naphthiazole-(2)]methinecyanine methosulfate 2-mercapto-alpha-naphthiazole (43.8 g. 0.2 mole) was added to a solution of 8 g. NaOH dissolved in 500 ml. of ethanol. There was then added dropwise with stirring, 25.2 g. of dimethylsulfate to yield 10 g. of a viscous oil, 2-methyl-marcapto-alpha-naphthiazole. This material was quaternized by reaction with dimethylsulfate on the steam bath. A mixture of 1.428 g. (0.004 mole) of this quaternary salt, 3-methyl-2-methylmercapto-alpha-naphthiazolium methosulfate, 1.228 g. (0.004 mole) 2,3-dimethyl-5-methacrylamidobenzothiazolium methosulfate (prepared in Example 7) and 20 ml. absolute ethanol was heated until a solution formed. One ml. triethylamine was added and after 5 minutes of refluxing a yellow color formed and a dye precipitated on cooling. The dye, named at the start of this example, was filtered on a suction funnel, washed with ethanol and then recrystallized from ethanol to yield 1 g. of a yellow dye for which the melting point could not be determined because of polymerization and later decomposition above 310° C. The curve obtained on a spectrophotometer (General Electric) of an ethanol-water solution of this dye revealed on absorption maximum at 447 millimicrons.

EXAMPLE 9

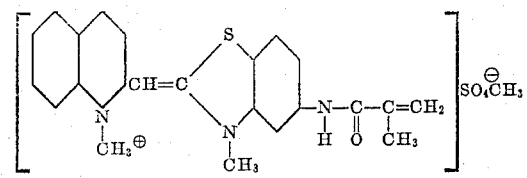

[5-methacrylamido-3-methyl-benzothiazole-(2)][1-methyl-quinoline-(2)]methinecyanine methosulfate A mixture of 17.5 g. (0.1 mole) 2-methylmercaptoquinoline and 12.6 g. (0.1 mole) dimethyl sulfate were heated on a steam bath for ½ hours. The resulting viscous material was slurried in acetone and the quaternary salt separated as a white solid. The salt was filtered on a suction filter and washed with acetone to yield 26 g. of 1-methyl-2-methylmercaptoquinolinium methosulfate.

A mixture of 1.79 g. (0.05 moles) of 2,3-dimethyl-5-methacrylamidobenzothiazolium methosulfate (prepared in Example 7) and 1.5 g. (0.05 moles) 1-methyl-2-methylmercaptoquinolinium methosulfate (prepared above) was heated in 20 ml. absolute ethanol until dissolved. One ml. triethylamine was added and after refluxing for 5 minutes an orange dye separated. The dye, named at the start of this example, was filtered on a Buchner funnel, washed with ethanol and then recrystallized from ethanol to yield 1.1 g. of the orange dye monomer. Melting point could not be determined because of polymerizataion and decomposition between 290 and 295° C. An ethanol-water solution of this dye had an absorption maximum at 487 millimicrons when analyzed on a spectrophotometer (General Electric).

EXAMPLE 10

[5 - Methacrylamido - 3 - Methylbenzothiazole - (2)] [3-Methylbenzothiazole-(2)]Methinecyanine Methosulfate A mixture of 1.79 g. (0.05 mole) 2,3-dimethyl-5-methacrylamidobenzothiazolium methosulfate (prepared in Example 7) and 1.5 g. (0.05 mole) 3-methyl-2-methylmercaptobenzothiazolium methosulfate, made from 18.1 g. 2-methylmercaptobenzthiazole and 12.6 g. dimethylsulfate by heating them on a steam bath until the quaternary salt solidified. It was pulverized in acetone, filtered, washed with acetone, and air dried to yield 26 g. of a white solid. The salt was heated in 40 ml. absolute ethanol until dissolved. One ml. of triethylamine was added to the solution and on refluxing a yellow solid precipitated. After cooling, the yellow solid was filtered and recrystallized from ethanol to yield 1.6 grams of the dye monomer named at the start of this example. No melting point could be obtained because of polymerization and latter decomposition at 280–285° C. An ethanol-water solution of this dye had an absorption maximum at 430 millimicrons when analyzed on a spectrophotometer (General Electric). This dye has a structural formula like that in Example 9 except that the left-hand quinoline radical was replaced by a benzothiazole radical.

EXAMPLE 11

One hundred ml. of the polyvinyl alcohol solution described in Example 2 were mixed with 1.79 g. (0.05 mole) of the monomeric quaternary salt described in Example 7, 2,3-dimethyl-5 - methacrylamidobenzothiazolium methosulfate. A solution was formed from this mixture by stirring and to this was added a solution of 2 g. benzoin methylether in 20 ml. of ethanol. Then 1g. acrylamide was dissolved in this solution. The resulting solution was coated on a white cardboard support under subdued light and air dried. It was then exposed through a 65-line half-tone negative for three minutes using a sun lamp 10 inches above the print, thus causing an image-wise copolymerization.

The exposed coating was developed by treating it with a solution consisting of 2 ml. triethylamine and 1.5 g. (0.05 mole) 3-methyl-2-methylmercaptobenzothiazolium methosulfate (preparation described in Example 10) dissolved in 50 ml. ethanol. A yellow colored negative print was thereby obtained which became clearer upon washing with ethanol.

The above procedure was repeated except that 10 ml. of water were added to the developer solution. After washing with alcohol, a positive image remained.

EXAMPLE 12

Example 11 was repeated, using the same molar quantities of reactants, except that the quaternary salt employed in the developer was 3-methyl-2-methylmercapto-alpha-naphthiazolium methosulfate (prepared in Example 8). A negative print was obtained as in Example 11 in the absence of water in the developer while a positive print was obtained when water was present in the developer. The structure of the yellow dye of the image is shown at the start of Example 8.

EXAMPLE 13

Example 11 was repeated, using the same molar quantities of reactants, except that the quaternary salt employed in the developer was 1-methyl-2-methylmercaptoquinolinium methosulfate (prepared in Example 9). As in Example 11, a negative print was obtained in the absence of water in the developer while a positive print was obtained when water was present in the developer. The orange dye of the image is that shown at the start of Example 9.

EXAMPLE 14

Example 11 was repated, using the same molar quantities of reactants, except that the quaternary salt employed in the developer was 1-methyl-2-methylmercaptoquinolinium methosulfate (prepared in Example 9) and the copolymerizing monomer, acrylamide, was omitted from the coating solutions. A deep orange colored positive print was obtained (using 10 ml. water in the developer), with the dye being that structure shown at the start of Example 9.

EXAMPLE 15

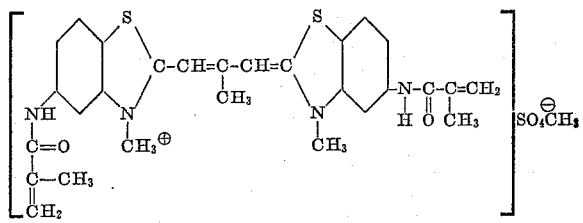

Bis-5-methacrylamido-3-methylbenzothiazole-(2)-2-methyl-trimethinecyanine methosulfate A mixture of 5 g. 2,3-dimethyl-5-methacrylamidobenzothiazolium methosulfate (prepared in Example 7) and 10 ml. ethyl-o-acetate (triethylorthoacetate) was dissolved in 50 ml. pyridine. The mixture was heated to reflux for 5 minutes and a deep purple color formed. The solution was diluted with acetone and, upon separation of the dye, the product was filtered on a suction filter. After washing with acetone, it was then purified by recrystallization from ethanol to yield 0.5 g. of a dark green solid of the structure shown at the start of this example. The dye was a deep magenta color in ethanol solution. An absorption spectra of a methanol solution of the dye revealed an absorption peak at 552 millimicrons.

The dye monomer was isolated in another experiment wherein small quantities of m-methacrylamidobenzaldehyde and 3-ethyl-2-methylbenzothiazolium iodide were dissolved in ethanol, the solution heated to reflux, and an excess of the catalyst piperidine added. After 15 minutes' reflux, a deep purple color was formed. The dye was isolated by adding ether, the precipitated dye filtered and washed with water, and air dried. The dye was purified by dissolving in 95% ethanol and precipitated by dilution with ether. Then it was filtered, washed with ether and air dried. After dissolving in 95% ethanol an absorption spectrum obtained with a General Electric Recording Spectrophotometer, Catalogue Number 596,204, revealed a maximum absorption at 562 millimicrons.

By substituting for the 6-aminoquinaldine of Example 1, equivalent amounts of each of the specific amino-substituted heterocyclic-nitrogen compounds containing a reactive methyl group in the alpha or gamma position to the heterocyclic nitrogen atom listed above and in U.S. Patent 2,107,379, one can obtain the corresponding methacrylamido compounds. Similarly, by substituting both such compounds and acrylyl chloride, the corresponding acrylylamido compounds can be made. These ethylenically unsaturated amides can be substituted for the 6-methacrylamidoquinaldine quaternary salt in Examples 2 and 3 to give similar results.

Any of the addition polymerization initiators described in U.S. Patent 2,760,863 can be used in compositions of this invention. The initiators are preferably thermally inactive below 85° C. Preferred initiators include benzoin and benzoin methyl ethers and anthroquinone.

Aside from their use in light-sensitive coatings, any of the polymerizable monomers described herein can be polymerized or copolymerized with non-color-forming monomers by conventional polymerization procedures in solution, in bulk or in emulsions to yield polymeric dyes. Also, these polymerizable monomers can be coupled so as to form optical sensitizing dyes which are useful in photographic emulsions.

The unsaturated amides and other ingredients of a photopolymerizable composition can be coated on or impregnated in the surface of paper, cardboard or other somewhat porous material in which case the cellulose will be the binding agent or material. Thus, a water-permeable protective colloid binder is not necessary to form a satisfactory layer or stratum.

In Examples 2 through 6, and 11 through 14, the white poster board is made by coating plain chip-board on one or both sides with a white paper stock consisting of a mixture of bleached sulfite, de-inked paper stock and soft white shavings (waste from sulfite printing paper). This coating is laid on in one stage of the paper board making.

In addition to the binding agents described in the examples, a wide variety of water- and solvent-soluble binders may be used, e.g., polyvinyl esters and acetals with and without color forming and/or solubilizing substituents including those described in Overman U.S. Patent 2,828,205 and Taylor et al. U.S. Patent 2,828,204; cellulose derivatives, e.g., lower alkyl ethers and esters, glycollates, regenerated cellulose; and amphoteric methacrylamide copolymers containing betaine groups, borate-gelable methacrylamide copolymers and the amphoteric, borate-gelable methacrylamide copolymers of Shacklett U.S. Patents 2,834,758, 2,830,972 and 2,833,650. In addition, binding agents such as gum arabic, starch glycollate, lac resins and various synthetic resins, e.g., solvent-soluble alkyl resins, polyacrylic and alkacrylic acids and esters and phenol/aldehyde and amino/aldehyde resins may be used.

As indicated in the examples, a wide variety of supports may be coated with the polymerizable compositions of the invention including metals, e.g., iron, steel, copper, aluminum and brass, sheets and plates; paper, cardboard, regenerated cellulose, e.g. porcelain and earthenware; films of cellulosic esters and ethers or synthetic resins or superpolymers, e.g., polyacrylates and methacrylates, polystyrene, polyamides, polyesters, polycarbonate esters, polyvinyl esters and acetals and copolymers of vinyl and vinylidene compounds, e.g., vinyl chloride/vinyl acetate, vinylidene chloride/acrylonitrile; and glass. It should be understood that the binding agents and compositions coated on the various surfaces mentioned will be selected to give adequate adhesion between the coating and support.

The polymerizable dye-forming monomers of this invention are useful for many purposes. When coated in layers, with or without a binder, they may be used in photographic systems based on exposure to ultraviolet, visible or infrared illumination behind a transparency or in the case of infrared systems on top of a transparency to form positive or negative images on development and washing in solvent. The images thus formed are useful in copying documents or making continuous tone copies of pictures such as portraits in a wide variety of colors by a suitable method. When coated on films they may be used to prepare sound records of either the variable density or variable area type.

The compositions of the invention are also useful in making prints by a transfer process where solubilized material in the unexposed areas is transferred to another carrier and subsequently hardened by light and/or heat to form a direct positive of the original subject. The compositions can be used to form patterns in color on metals, ceramics, textiles, glass, paper, wood and plastic films and foils. Alternatively, they may be used to form solid color in situ on such base materials, e.g., by over-all exposure to polymerizing radiation.

The dye-forming monomers and polymers prepared therefrom have many advantages over the prior art color-forming compounds. In the first place, since each monomer unit has a dye-forming group attached thereto, homopolymerization makes it possible to obtain non-migratory color-coupling polymers and dyes of greater color concentration than the previously known materials. In the field of photography the photoinitiated addition polymerization provides a system of greater speed and photo-efficiency than processes involving gelatin-bichromate systems, diazo reactions, etc. In addition, the conditions of the process and selection of monomers makes it possible to obtain a wide range of contrasts for particular processes. Thus, a very high contrast image may be formed for line work, solid type matter, etc., while a low to medium contrast image might be used in copying continuous tone images, such as portraits. In addition to light-activated polymerization, these materials can be polymerized by heat and can be used in methods of copying images by using thermal initiators in the place of photoinitiators. Grainless multicolor prints may also be obtained by superimposing several layers containing the desired color-forming monomers. Since photoinitiators which are insensitive to visible radiation may be used if desired, copying materials which can be handled in room lights may be prepared with these materials.

What is claimed is:
1. A photopolymerizable composition comprising
  (a) an addition polymerization initiator activatable by actinic light, and
  (b) an addition polymerizable quaternary salt of the general formula:

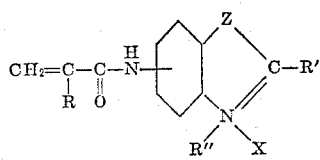

wherein R is a member selected from the group consisting of hydrogen, alkyl of 1–4 carbon atoms, aryl, aralkyl and chlorine, R' is a member selected from the group consisting of hydrogen and a reactive group capable of dye condensation selected from the group consisting of reactive alkyl of 1–4 carbon atoms and hydrocarbonmercapto, R'' is alkyl, X is the negative radical of an acid, and Z is a divalent radical selected from the group consisting of —S—, —O—, —Se—,

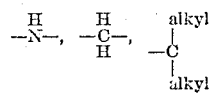

and

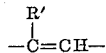

said quaternary salt being further characterized that only one of the radicals R' is hydrogen and the other is the reactive group capable of dye condensation.

2. A composition according to claim 1 wherein said quaternary salt is a 6-methacrylylamidoquinoline quaternary salt having a reactive methyl group in one of the positions alpha and gamma to the heterocyclic nitrogen atom.

3. A composition according to claim 1 wherein said quaternary salt is a 2-methyl-5-methacrylylamidobenzthiazole quaternary salt.

4. A composition according to claim 1 wherein said quaternary salt is 2,3-dimethyl-5-methacrylylamidobenzothiazolium methosulfate.

5. A composition as set forth in claim 1 wherein the initiator is present in an amount from 0.1 to 30% by weight of the composition.

6. A composition as set forth in claim 1 containing a water-permeable organic colloid having protective colloid properties.

7. A photopolymerizable element comprising a sheet support bearing a photopolymerizable layer of a composition as defined in claim 1.

8. An element as defined in claim 7 wherein the support is paper.

9. An element as defined in claim 7 wherein the support is metal.

10. An element as defined in claim 7 wherein the support is a self-supporting hydrophobic film.

11. A process for forming a photographic image which comprises (1) exposing to actinic light, imagewise, a photopolymerizable layer comprising
  (a) an addition polymerization initiator activatable by actinic light, and
  (b) an addition polymerizable quaternary salt of the general formula:

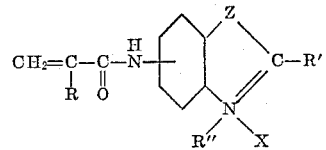

wherein R is a member selected from the group consisting of hydrogen, alkyl of 1–4 carbon atoms, aryl, aralkyl and chlorine, R' is a member selected from the group consisting of hydrogen and a reactive group capable of dye condensation selected from the group consisting of reactive alkyl of 1–4 carbon atoms and hydrocarbonmercapto, "R" is alkyl, X is the negative radical of an acid, and Z is a divalent radical selected from the group consisting of —S—, —O—, —Se—,

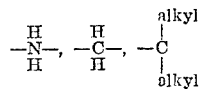

and

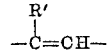

said quaternary salt being further characterized that only one of the radicals R' is hydrogen and the other is the reactive group capable of dye condensation until substantial addition polymerization takes place without polymerization in the unexposed portions of the layer,
(2) removing the unpolymerized portions of the layer, and (3) treating the exposed layer with a developer solution to form a polymeric dye image, steps (2) and (3) being carried out in either order.

References Cited in the file of this patent

UNITED STATES PATENTS

| | | |
|---|---|---|
| 2,288,197 | Kranzlein et al. | June 30, 1942 |
| 2,649,438 | Bruson | Aug. 18, 1953 |
| 2,791,504 | Plambeck | May 7, 1957 |
| 2,875,047 | Oster | Feb. 24, 1959 |
| 2,884,057 | Wilson et al. | Apr. 28, 1959 |
| 2,897,200 | Maeder et al. | July 28, 1959 |
| 2,908,667 | Williams | Oct. 13, 1959 |
| 2,935,493 | Schuller et al. | May 3, 1960 |